United States Patent
Block

(10) Patent No.: US 9,672,746 B2
(45) Date of Patent: *Jun. 6, 2017

(54) TERRAIN AWARENESS SYSTEM WITH OBSTRUCTION ALERTS

(71) Applicant: Sandel Avionics, Inc., Vista, CA (US)

(72) Inventor: Gerald J. Block, Vista, CA (US)

(73) Assignee: SANDEL AVIONICS, INC., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,441

(22) Filed: Dec. 10, 2015

(65) Prior Publication Data

US 2016/0293020 A1    Oct. 6, 2016

Related U.S. Application Data

(63) Continuation of application No. 13/668,995, filed on Nov. 5, 2012, now Pat. No. 9,238,507.

(Continued)

(51) Int. Cl.
*B64D 13/00* (2006.01)
*G08G 5/00* (2006.01)
*G08G 5/04* (2006.01)

(52) U.S. Cl.
CPC .......... *G08G 5/0086* (2013.01); *B64D 13/00* (2013.01); *G08G 5/0013* (2013.01);
(Continued)

(58) Field of Classification Search
CPC combination set(s) only.
See application file for complete search history.

(56) References Cited

U.S. PATENT DOCUMENTS

| 6,021,374 | A  | 2/2000 | Wood |
| 6,678,588 | B2 | 1/2004 | He |

(Continued)

FOREIGN PATENT DOCUMENTS

| WO | 0239407 A1 | 5/2002 |
| WO | 2007054482 A1 | 5/2007 |

OTHER PUBLICATIONS

Sandel Avionics, "ST3400 TAWS/RMI Terrain Awareness and Warning System", (c) 2007, http://www.sandel.com/pdf.php/ST3400_0407.pdf.

(Continued)

*Primary Examiner* — Yonel Beaulieu
(74) *Attorney, Agent, or Firm* — Mark D. Wieczorek; Stuart H. Mayer; Mayer & Williams PC

(57) ABSTRACT

Current TAWS systems generally do not provide alerts based on structures or wire obstacles. Such structures and wire obstacles include transmission and electrical wires, and power lines, bridges, and buildings. The current system allows just such alerting. Such alerts are particularly useful for helicopter aircraft, which commonly fly at heights where such structures and obstacles are present near the normal flying altitude of the aircraft. Certain implementations of the system and method include a method of creating an obstacle for use in a terrain awareness warning system, including: receiving data about a first terminus of an obstacle; receiving data about a second terminus of the obstacle; constructing a virtual volume about the first and second termini and a volume therebetween; and storing the virtual volume, whereby a database may be constructed of virtual volumes for use in addition to terrain information to provide alerting on obstacles for an aircraft.

14 Claims, 3 Drawing Sheets

Related U.S. Application Data

(60) Provisional application No. 61/555,079, filed on Nov. 3, 2011.

(52) U.S. Cl.
CPC ......... *G08G 5/0021* (2013.01); *G08G 5/0026* (2013.01); *G08G 5/04* (2013.01); *G08G 5/045* (2013.01)

(56) References Cited

U.S. PATENT DOCUMENTS

| | | | |
|---|---|---|---|
| 7,375,678 | B2 | 5/2008 | Feyereisen et al. |
| 7,397,351 | B1 | 7/2008 | Rubin et al. |
| 7,668,628 | B1* | 2/2010 | Carrico ............... G01C 23/005 340/961 |
| 8,756,012 | B2 | 6/2014 | He et al. |
| 2003/0195672 | A1* | 10/2003 | He ........................ G01C 23/00 701/3 |
| 2004/0083038 | A1* | 4/2004 | He ........................ G06T 15/04 701/3 |
| 2005/0113985 | A1* | 5/2005 | Greene ................. G08G 5/045 701/9 |
| 2006/0009887 | A1 | 1/2006 | Rubin et al. |
| 2006/0052912 | A1* | 3/2006 | Meunier ............... G08G 5/045 701/10 |
| 2007/0018887 | A1* | 1/2007 | Feyereisen ............ G01C 23/00 342/176 |
| 2008/0140267 | A1* | 6/2008 | Matuska ................ G01C 5/005 701/3 |
| 2008/0243383 | A1* | 10/2008 | Lin ...................... G01C 21/165 701/469 |
| 2009/0228223 | A1 | 9/2009 | Liu et al. |

OTHER PUBLICATIONS

Sandel Avionics, "ST3400 TAWS/RMI Support: Installation Manual", Document No. 82002-IM, Revision J1, Sep. 1, 2004, http://www.sandel.com/ST3400_TAWS_sup_IM.php.

Sandel Avionics, "ST3400 Pilot's Guide", Effectivity and Errata, Apr. 11, 2008, http://www.sandel.com/pdf.php/82002-PG-F-ST3400-Pilot-Guide_with_errata.pdf.

Sandel Avionics, "ST3400H HeliTAWS Helicopter Terrain Safety System", (c) 2011, http://www.sandel.com/ST3400H_HeliTAWS_0711.pdf.

Sandel Avionics, "ST3400H HeliTAWS Helicopter Terrain Awareness Warning System", Installation Manual, Most recent revision Oct. 5, 2011, http://www.sandel.com/82046-IM-D_ST3400H_Installation_Manual.pdf.

Sandel Avionics, "ST3400H HeliTAWS Helicopter Terrain Awareness Warning System", Pilot's Guide, Sep. 30, 2011, http://www.sandel.com/pdf.php/82046-PG-C1_ST3400H_Pilots_Guide.pdf.

* cited by examiner (TOP VIEW)

TERRAIN AWARENESS SYSTEM WITH OBSTRUCTION ALERTS

CROSS-REFERENCE TO RELATED APPLICATIONS

This application is a continuation of U.S. Ser. No. 13/668,995 filed Nov. 5, 2012, which issued on Jan. 19, 2016 as U.S. Pat. No. 9,238,507, entitled, "Terrain Awareness System with Obstruction Alerts" which claims benefit of priority of U.S. Provisional Patent Application Ser. No. 61/555,079, filed Nov. 3, 2011, entitled "Terrain Awareness System with Obstruction Alerts", which is owned by the assignee of the present application and herein incorporated by reference in its entirety.

FIELD OF THE INVENTION

The field of the invention relates to avionics instrumentation, and more particularly to avionics instrumentation involving alerting functionality.

BACKGROUND OF THE INVENTION

Terrain awareness systems or TAWS are known which give alerts based on locations of aircraft with respect to terrain or point obstacles. Such systems are clearly useful for warning pilots of impending dangerous terrain. However, such systems fail to account for important factors, including that not all obstacles are represented in these systems. This may be particularly true for aircraft such as helicopters, which often fly at different and in particular lower altitudes than fixed-wing aircraft.

One reason for such deficiency is that, if obstacles were kept in a typical gridded database, which does not allow for discrete points, the obstacles would be considered at least as big as a grid square, e.g., 300 feet on a side, and in some cases as large as several grid squares (where an obstacle touches on the several grid squares, even if not fully occupying them).

SUMMARY OF THE INVENTION

Current systems generally do not provide alerts based on structures or wire obstacles, which often do not appear on terrain maps. Such structures and wire obstacles include transmission wires, electrical wires, power lines, bridges, and buildings, for instance.

Such alerts would be particularly useful for helicopter aircraft, which commonly fly at heights where such structures and obstacles are present near the normal flying altitude of the aircraft.

In the current system, structures and wire obstacles may be accounted for and alerted on. The same may be the subject of a database separate from that kept for terrain, or the two may be combined. As described below, various advantages may inure to keeping them separate.

In one aspect, the invention is directed towards a method of creating an obstacle for use in a terrain awareness warning system, including: receiving data about a first terminus of an obstacle; receiving data about a second terminus of the obstacle; constructing a virtual volume about the first and second termini and a volume therebetween; and storing the virtual volume, whereby a database may be constructed of virtual volumes for use in addition to terrain information to provide alerting on obstacles for an aircraft.

Implementations of the invention may include one or more following. The first and second termini may correspond to electrical or communication towers, and the virtual volume therebetween may correspond to a wire disposed between the towers. The first and second termini may correspond to bridge towers, and the virtual volume therebetween may correspond to a bridge disposed between the towers. The virtual volume may correspond to a virtual wire pair created from an actual wire position plus and minus a position uncertainty in a direction normal to the wire direction. The virtual volume may have an associated size, and the size of the virtual volume may be proportional to an uncertainty associated with the data about the first and second termini.

In a related aspect, the invention is directed towards a non-transitory computer-readable medium, including instructions for causing a computing environment to perform the above method.

In another aspect, the invention is directed towards a method of alerting an aircraft about obstacles, including: receiving data about a plurality of obstacles, each obstacle data including location and height information about a first and second termini of a respective obstacle of the plurality; from the location and height information, constructing a virtual volume in a database, the virtual volume extending at least between the first and second termini; receiving data about a current position and trajectory of an aircraft; if the current position of the aircraft indicates that the aircraft is within the virtual volume, or if the current trajectory of the aircraft indicates that the aircraft will become within the virtual volume, then causing an alert.

Implementations of the invention may include one or more following. The virtual volume may have an associated size, and the size of the virtual volume may be directly proportional to an uncertainty associated with the location or height information. The method may further include basing an intensity of the alert based on a calculated time to impact between the aircraft and the virtual volume.

In a related aspect, the invention is directed towards a non-transitory computer-readable medium, including instructions for causing a computing environment to perform the above method.

In a further aspect, the invention is directed towards a method of creating an obstacle for use in a terrain awareness warning system, the obstacle for alerting an aircraft of obstacles in a lateral plane, including: receiving data about a plurality of obstacles, each obstacle data including location and/or extent information about a first and second tower of a respective obstacle of the plurality; constructing a virtual wire pair associated with the obstacle, the virtual wire pair substantially parallel and separated by a distance proportional to an uncertainty in the location information; constructing a virtual rectangle, the virtual rectangle extending at least between the first and second tower and between the virtual wire pair; and storing data about the virtual rectangle in a database.

Implementations of the invention may include one or more following. The virtual rectangle may extend between the virtual wire pair and may further include an extent of each tower. The extent of each tower may be of a size proportional to an uncertainty in data about the tower diameter.

In a related aspect, the invention is directed towards a non-transitory computer-readable medium, including instructions for causing a computing environment to perform the above method.

In yet another aspect, the invention is directed towards a method of alerting an aircraft of obstacles in a lateral plane, including: receiving data about a current position and trajectory of an aircraft; and if the current position of the aircraft indicates that the aircraft is within a virtual rectangle defined at least in part by a virtual wire pair defined between a first and second tower associated with an obstacle, where a dimension of the virtual rectangle is at least in part dependent on a position uncertainty in the first or second tower or both, or if the current trajectory of the aircraft indicates that the aircraft will become within the virtual rectangle, then causing an alert.

Implementations of the invention may include one or more following. The method may further include basing an intensity of the alert based on a calculated time to impact between the aircraft and the virtual rectangle.

In a related aspect, the invention is directed towards a non-transitory computer-readable medium, including instructions for causing a computing environment to perform the above method.

In yet another aspect, the invention is directed towards a method of alerting an aircraft of obstacles in a vertical plane, including: receiving data including a plurality of virtual volumes, each virtual volume extending at least between a first tower and a second tower; receiving data about a current position and trajectory of an aircraft; and if the current altitude of the aircraft indicates that the aircraft is below the altitude of either of the first and second towers or the virtual volume, or if the current trajectory indicates an aircraft will become below the altitude of either of the first and second towers or below the virtual volume, then causing an alert.

Implementations of the invention may include one or more following. The first and second towers may be at different heights, and thus a non-zero slope may exist between the towers, and the method may further include causing an alert based on data about the slope and the current trajectory of the aircraft. The method may further include basing an intensity of the alert based on a calculated time to impact between the aircraft and the virtual volume. The virtual volumes may be created using any of the methods above.

In a related aspect, the invention is directed towards a non-transitory computer-readable medium, including instructions for causing a computing environment to perform the above method.

Advantages of certain implementations of the invention may include one or more of the following. A highly accurate TAWS system may be provided which can account for obstacles not alerted on by other TAWS systems.

Implementations of the current invention may provide a particularly advantageous system for helicopters and other low-flying aircraft. Another advantage is that the system can create alerts based on structures such as bridges. To accommodate structures such as bridges, such structures may be modeled as one or more rectangular solids within the system, or approximated as composed of groups of line obstacles creating a closed or almost-closed polygon.

In a particularly advantageous implementation, obstacles portrayed on a display may be enlarged if close to the aircraft and reduced in size if farther away, either in altitude or distance or both. In this way, a pilot's attention is drawn to obstacles that are closer and thus generally more dangerous.

BRIEF DESCRIPTION OF THE DRAWINGS

FIG. 1 illustrates a typical situation of a powerline or other wire. A similar situation will be understood for bridges or the like.

Like reference numerals refer to like elements throughout.

DETAILED DESCRIPTION

Figure 1:
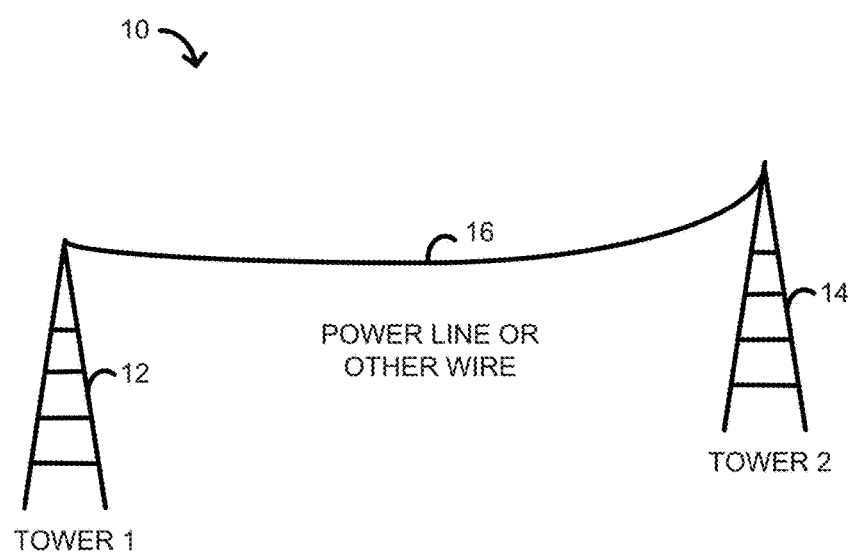

Referring to FIG. 1, a situation is illustrated of a transmission or power line. The system 10 includes a first obstruction (Tower 1) 12 and a second obstruction (Tower 2) 14. Between the first and second obstruction is a powerline 16 or other such wire. It will be understood that the first and second obstruction may also relate to bridge towers with a bridge between the same.

Figure 2:
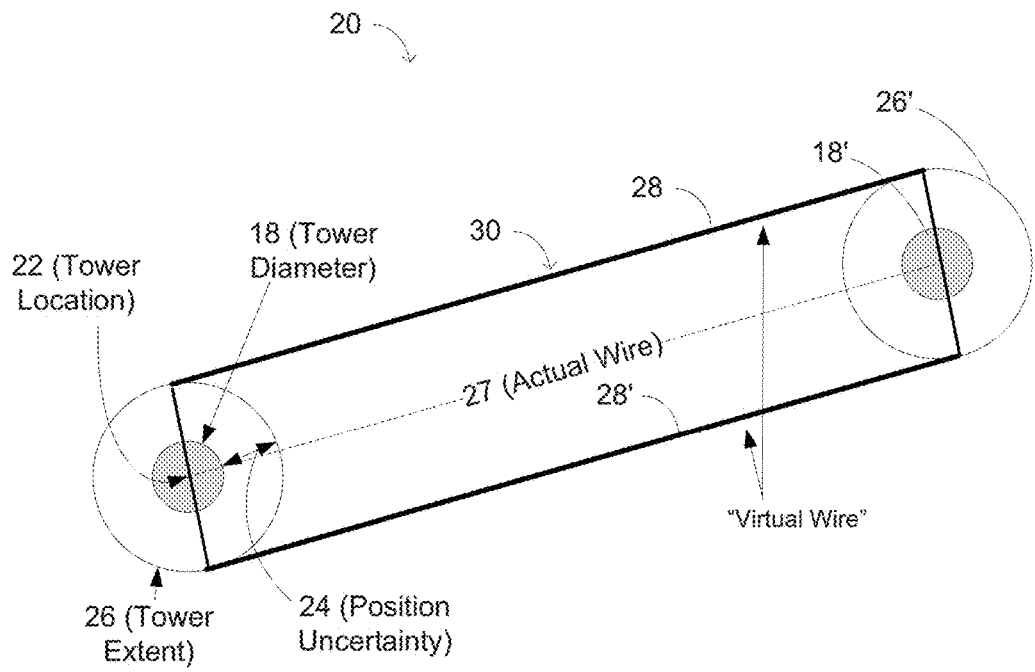
FIG. 2 illustrates an alerting scheme according to one implementation of the present invention.

Referring to FIG. 2, a more detailed schematic illustration is provided of a transmission or power line system 20. Transmission lines, being typically comprised of towers at, e.g., a location 22, with wires between them, may be modeled with an associated position uncertainty described in greater detail below. There may be a position uncertainty with respect to the tower as well as with respect to the wire, though the multiple uncertainties may be modeled with just one (or more) variables as appropriate. The towers may be considered a pair of cylinders 18 and 18', and the pair of cylinders defines an enclosed volume 30. Each tower 18 and 18' is considered to have an associated position uncertainty 24, which leads to a total tower extent 26 and 26'. While the position uncertainties are shown in FIG. 2 as being equal, it will be understood that they may vary.

The cylinders represent the towers 18 and 18' discreetly in their actual positions. Each obstacle may be composed of the obstacle, its radius, and an uncertainty around the radius. The use of an uncertainty radius accounts for the fact that the known plotting inaccuracy of the obstacle could result in an actual location anywhere within the uncertainty circle centered on the plotted position. A thereby-enlarged circle may then constructed around the obstruction at which, if an aircraft's position is within the alerting circle or if the system determines that its trajectory will take it into the circle within a predetermined alerting time, an alert is issued. This alerting circle is termed the tower's extent.

Alerting in the lateral plane may be calculated against both the tower extent and a virtual wire pair 28 and 28' created from the position of the actual wire 27 plus and minus the position uncertainty in a direction normal to the wire direction. In one implementation the virtual wire pair is implemented as a rectangle, with the alerting based on the rectangle extent. In the case of multiple towers forming a line that is not overly curved, it may not be necessary to consider the tower circle except for the start and end towers.

Alerting in the vertical plane may be calculated against the altitudes of the towers and the vertical trajectory of the aircraft. If the towers are at different heights, the alerting can be performed used the highest height, which is the most conservative case, and computing and alerting on the slope.

The type and intensity of the alert may be based on time to 'impact' of the aircraft and the obstacle extent, e.g., the tower extent 26, 26' and/or the volume 30. In one specific implementation, the difference between a caution (amber) and a warning (red) may be made dependent on the time remaining to 'impact'.

There are a number of ways to implement the alerting function. In one implementation, the wire-pair data is employed to create the rectangle, and then the towers are provided separately to indicate the radii. In this implementation, data requirements may be reduced because tower radii are only needed at the end points of a multi-tower line. In other implementations, however, circles may be plotted at each tower location, and in this case the alerting area of the rectangle and the circles may at least partially overlap.

In some cases, a velocity, track or trajectory function may be rendered inactive or disabled, e.g., when a helicopter is hovering. However, an alert may still be made based on proximity, i.e., if the aircraft is within the alerting circle or rectangle.

A number of variations will be understood to one of ordinary skill in the art, given the above description. For example, on the map display, the obstacle may be portrayed at its plotted position, with or without depicting the obstacle radius or uncertainty radius. When an alert is issued, the extent of the uncertainty circle may be depicted on the pilot's display, representing an area where "evasive action" associated with the alert is required. The size of the uncertainty may be generally determined by the authority which issues the information. In some cases, obstacle data may be correct to within a few centimeters, and the uncertainty is correspondingly small. In other cases, the obstacle data may be correct to only within several hundred feet, and the uncertainty is correspondingly large. In order to produce a reasonable estimate of a tower obstacle radius in the absence of exact information, an estimate may be made to produce a default radius. One estimate would be to make the radius equal to its height, thus accommodating for the presence of guy wires.

In a "Relative Altitude" display, obstacles may be portrayed on a display in different colors, e.g., depending on their height relative to the aircraft, much as terrain is displayed.

In a topographic display, where all terrain is shown, the size of the obstacle depicted on the screen may be adjusted based on its distance and relative altitude to the aircraft, i.e., a relative threat level, much as the human eye would see it in real life: farther away or very much lower obstacles are depicted with smaller sizes; and the size may increase as the obstacle gets closer vertically and laterally.

As in terrain, all obstacles above the current altitude may be depicted in red. Otherwise the same may be illustrated in grey, i.e., not color-coded by altitude, so as not to obstruct the terrain coloring or confuse the pilot with too many colors.

Transmission lines or other forms of wires may be indicated as being in the form of segments between their supporting towers. When a conflict with a wire exists, the wire segment nearest to the aircraft may be caused to be highlighted or to flash. An amber "CAUTION WIRE" or red "WARNING WIRE" alert annunciation may appear on the display. The alert annunciation may be accompanied by an audible alert.

In some implementations, the display may be switchable between a terrain view, obstacle view, or a combination of these.

Figure 3:
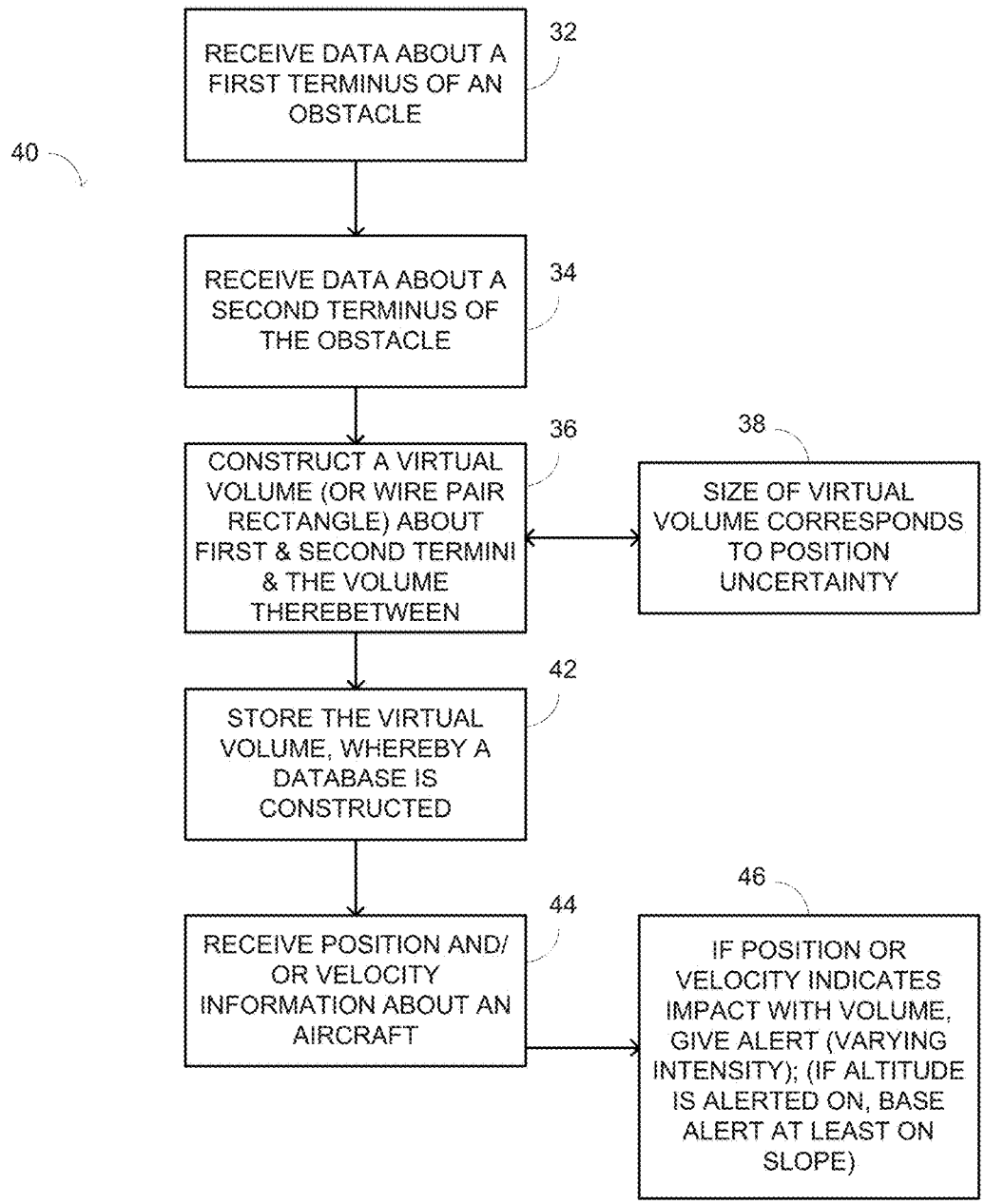
FIG. 3 is a flowchart of a method according to an implementation of the present invention.

FIG. 3 illustrates a flowchart 40 in which one implementation of a method of the invention may be arranged. A first step is to receive data about a first terminus of an obstacle (step 32). Similarly, a second step is to receive data about a second terminus of the obstacle (step 34). The first and second termini may correspond to towers for transmission lines, power lines, bridges, or the like. A virtual volume may then be constructed about the first and second termini and the volume thereby defined (step 36). For alerting in a lateral plane, the powerline may be approximated by a wire pair that is disposed about the actual line. The distance of each of the wire pair from the actual line may be associated with an uncertainty in the position of the wire or the towers. In the same way, the position uncertainty of the tower may correspond to a tower extent that is proportional to the uncertainty (step 38) as noted above. The virtual volume may then be stored, such that a database is constructed (step 42).

Once the database is constructed and used in an avionics TAWS component, position and/or velocity data of an aircraft may be received (step 44). The velocity information may be, e.g., trajectory information, which provides not only speed but also direction. If the position or velocity indicates a potential impact with the virtual volume, or virtual rectangle, then an alert may be given. The alert may vary in intensity based on the time to impact. If the alert is given based on the altitude or vertical velocity of the aircraft, the alert may be based at least on the slope.

Other variations will also be understood by one of ordinary skill in the art given this disclosure. For example, rather than requiring two termini and a volume therebetween, alerts may be caused to occur based on the locations of buildings or other singular structures.

The system and method may be fully implemented in any number of computing devices. Typically, instructions are laid out on computer-readable media, generally non-transitory, and these instructions are sufficient to allow a processor in the computing device to implement the method of the invention. The computer-readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

The invention claimed is:

1. A method of creating an obstacle for use in a terrain awareness warning system, comprising:
   a. receiving data about a first terminus of an obstacle;
   b. receiving data about a second terminus of the obstacle;

c. constructing a virtual volume about the first and second termini and a volume therebetween; and d. storing the virtual volume, whereby a database may be constructed of virtual volumes for use in addition to terrain information to provide alerting on obstacles for an aircraft.

2. The method of claim 1, wherein the first and second termini correspond to electrical or communication towers, and wherein the virtual volume therebetween corresponds to a wire disposed between the towers.

3. The method of claim 1, wherein the first and second termini correspond to bridge towers, and wherein the virtual volume therebetween corresponds to a bridge disposed between the towers.

4. The method of claim 1, wherein the virtual volume corresponds to a virtual wire pair created from an actual wire position plus and minus a position uncertainty in a direction normal to the wire direction.

5. The method of claim 1, wherein the virtual volume has an associated size, and wherein the size of the virtual volume is proportional to an uncertainty associated with the data about the first and second termini.

6. A non-transitory computer-readable medium, comprising instructions for causing a computing environment to perform the method of claim 1.

7. A method of alerting an aircraft about obstacles, comprising:

a. receiving data about a plurality of obstacles, each obstacle data including location and height information about a first and second termini of a respective obstacle of the plurality;

b. from the location and height information, constructing a virtual volume in a database, the virtual volume extending at least between the first and second termini;

c. receiving data about a current position and trajectory of an aircraft;

d. if the current position of the aircraft indicates that the aircraft is within the virtual volume, or if the current trajectory of the aircraft indicates that the aircraft will become within the virtual volume, then causing an alert.

8. The method of claim 7, wherein the virtual volume has an associated size, and wherein the size of the virtual volume is directly proportional to an uncertainty associated with the location or height information.

9. The method of claim 7, further comprising basing an intensity of the alert based on a calculated time to impact between the aircraft and the virtual volume.

10. A non-transitory computer-readable medium, comprising instructions for causing a computing environment to perform the method of claim 7.

11. A method of creating an obstacle for use in a terrain awareness warning system, the obstacle for alerting an aircraft of obstacles in a lateral plane, comprising:

a. receiving data about a plurality of obstacles, each obstacle data including location and/or extent information about a first and second tower of a respective obstacle of the plurality;

b. constructing a virtual wire pair associated with the obstacle, the virtual wire pair substantially parallel and separated by a distance proportional to an uncertainty in the location information;

c. constructing a virtual rectangle, the virtual rectangle extending at least between the first and second tower and between the virtual wire pair; and d. storing data about the virtual rectangle in a database.

12. The method of claim 11, wherein the virtual rectangle extends between the virtual wire pair and further includes an extent of each tower.

13. The method of claim 11, wherein the extent of each tower is of a size proportional to an uncertainty in data about the tower diameter.

14. A non-transitory computer-readable medium, comprising instructions for causing a computing environment to perform the method of claim 11.

* * * * *